US008922811B2

(12) United States Patent
DeRoller (10) Patent No.: US 8,922,811 B2
(45) Date of Patent: Dec. 30, 2014

(54) METHOD, SYSTEM AND PROCESSOR-READABLE MEDIUM FOR AUTOMATICALLY SELECTING A JOB TRACKING SOURCE

(75) Inventor: Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 217 days.

(21) Appl. No.: 13/099,585

(22) Filed: May 3, 2011

(65) Prior Publication Data
US 2012/0281250 A1 Nov. 8, 2012

(51) Int. Cl.
G06F 3/12 (2006.01)
(52) U.S. Cl.
CPC .............. G06F 3/1219 (2013.01); G06F 3/126 (2013.01); G06F 3/1273 (2013.01); G06F 3/1288 (2013.01)
USPC .......................... 358/1.15; 358/1.14; 358/474
(58) Field of Classification Search
None
See application file for complete search history.

(56) References Cited

U.S. PATENT DOCUMENTS

| | | | |
|---|---|---|---|
| 5,920,405 A | 7/1999 | McIntyre et al. | |
| 7,474,428 B2 | 1/2009 | Morris-Jones et al. | |
| 7,525,676 B2 | 4/2009 | Pesar | |
| 2003/0223092 A1 | 12/2003 | Caffary, Jr. et al. | |
| 2007/0103715 A1 | 5/2007 | Nakata | |
| 2008/0246986 A1 | 10/2008 | Scrafford et al. | |
| 2009/0273808 A1* | 11/2009 | Kohli et al. | 358/1.15 |
| 2009/0314836 A1 | 12/2009 | Kothari et al. | |
| 2010/0195138 A1* | 8/2010 | DeRoller | 358/1.15 |
| 2011/0037996 A1 | 2/2011 | DeRoller | |
| 2011/0141497 A1* | 6/2011 | Willamowski et al. | 358/1.9 |

* cited by examiner

Primary Examiner — Mark Zimmerman
Assistant Examiner — Darryl V Dottin
(74) Attorney, Agent, or Firm — Kevin Soules; Kermit D. Lopez; Luis M. Ortiz (57) ABSTRACT

A method and system for automatically selecting an accurate job tracking source with respect to each rendering device. An output management solution in association with a device manager can be configured to include a device-based accounting source, a job tracking agent source, and a file import source. The job tracking data sources can be configured by an administrator and can be ranked within the device manager based on an accuracy setting. The device-based accounting source can be selected as the most accurate source upon detection of a built-in job tracking capability with respect to the multi-function device. The job tracking agent source and/or the file import source can be selected as the most accurate source if the built-in job tracking capability is not available. A historical job tracking database can be searched by the device manager in order to detect the job tracking agent source.

20 Claims, 5 Drawing Sheets

METHOD, SYSTEM AND PROCESSOR-READABLE MEDIUM FOR AUTOMATICALLY SELECTING A JOB TRACKING SOURCE

TECHNICAL FIELD

Embodiments are generally related to print management systems and output job tracking techniques. Embodiments are also related to rendering devices such as, for example, printers, scanners, photocopy machines, multi function devices, and the like.

BACKGROUND OF THE INVENTION

Networked rendering devices can interact with an assemblage of other rendering devices, client devices, servers, and other components that are connected to and communicate over a network. One example of a rendering device is a MFD (Multi-Function Device), which includes the functionality of multiple rendering devices such as printers, scanners, faxes, copy machines, and so forth. Each MFD in a network, for example, can include a variety print capabilities options such as finishing, media quality, supply levels, and size.

Organizations such as, for example, business enterprises, educational institutions, government agencies, and medical offices often experience large expenditures relating to the rendering of paper documents and the difficulty in controlling the flow of information with respect to rendered (e.g., printed, scanned, copied) documents. The cost associated with rendering devices can be significantly high, especially for color printing, and it may therefore be extremely beneficial to track the usage of the rendering device resource so that the cost associated therewith may be determined for accounting purpose.

With the proliferation of color rendering devices, a managed rendering service provider deploys an output management solution for governing the use of the rendering document with respect to a customer. Output management solution monitors and manages an output volume of the networked rendering devices in order to optimize the device allocation to reduce output costs, streamline report creation, and lower paper wastage. Such output management solutions must be managed correctly when deployed as part of a managed services agreement in order to ensure cost effective print governance.

One example of print governance and rules and policies thereof is disclosed in U.S. Patent Application Publication No. 2011/0037996 which published to Matthew DeRoller on Feb. 17, 2011 and is entitled "Method and System for Automatically Creating Print Governance Rules and Polices." U.S. Patent Application Publication No. 2011/0037996, which is assigned to the Xerox Corporation of Norwalk, Conn., U.S.A. is incorporated herein by reference in its entirety. Another example of print governance is disclosed in U.S. Patent Application Publication No. 2010/0195138, which published to Matthew DeRoller on Aug. 5, 2010 and is entitled "Method and System for Tracking Data Based on Governance Rules and Policies." U.S. Patent Application Publication No. 2010/0195138, which is also assigned to the Xerox Corporation of Norwalk, Conn., U.S.A. is also incorporated herein by reference in its entirety.

A print governance application thus typically monitors a print request and enforces a business rule in order to maximize the rendering efficiency by reducing consumables such as, for example, toner and paper, and redirects the rendering job to more cost effective rendering device. Conventional output management solutions typically employ an agent installed on a rendering server and a data-processing system to control high-performance print volumes and cost associated with the rendering devices. Such approaches, however, do not provide effective print governance and are time consuming, labor intensive and inaccurate which can result in missed cost savings.

Based on the foregoing, it is believed that a need exists for an improved method and system for automatically selecting a most accurate job tracking source, as will be described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved output management method, system, and processor-readable medium.

It is another aspect of the disclosed embodiments to provide for an improved job tracking source.

It is a further aspect of the disclosed embodiment to provide for an improved method, system, and processor-readable medium for automatically selecting a most accurate job tracking source.

It is yet another aspect of the disclosed embodiment to provide for an improved method, system, and processor-readable medium for selecting the job tracking source based on availability and accuracy setting.

The aforementioned aspects and other objectives and advantages can now be achieved as described herein. A method, system, and processor-readable medium for automatically selecting an accurate job tracking source with respect to each rendering device are disclosed herein. An output management unit in association with a device manager can be configured to include at least three job tracking data sources such as, for example, a device-based accounting source, a job tracking agent source, and a file import source. The job tracking data sources can be configured by an administrator and can be ranked within the device manager based on an accuracy setting. The device-based accounting source can be selected as the most accurate source upon detection of a built-in job tracking capability with respect to the multi-function device.

The job tracking agent source and/or the file import source can be selected as the most accurate source if the built-in job tracking capabilities is not available. The device manager can search a historical job tracking database in order to detect the job tracking agent source. A flag can be provided if the job tracking agent source is not available to indicate a gap in the job tracking agent coverage. The device manager automatically selects the most accurate job tracking source with respect to each device in order to effectively monitor and manage an output volume of the networked rendering devices to reduce output cost, streamline report creation, and lower paper wastage.

Thus, in one embodiment, a method may be provided for automatically selecting an accurate job tracking source. Such a method can include a step or managing one or more devices utilizing a device manager and/or establishing a device manager for managing one or more such devices. Additional steps may include, for example, configuring an output management unit in association with the device manager to include one or more job tracking data sources in order to thereafter rank the one or more of the job tracking data sources within the device manager based on an accuracy setting. Other steps may include associating the output management unit with the device manager. Additional steps can include automatically selecting a most accurate job tracking source with respect to each device from the three or more job tracking data sources in order to effectively monitor and manage an output volume with respect to one or more of the devices and thereby reduce an output cost while providing an effective print governance.

In other embodiments, job tracking data sources can comprise, for example, a device-based accounting source, a job tracking agent course, a file import source, etc. In still other embodiments, a step can be implemented for selecting the device-based accounting source as a most accurate source upon a detection of a built-in job tracking capability with respect to one or more of the devices. In other embodiments, a step can be provided for selecting the job tracking agent source as the most accurate source if the built-in job tracking capabilities is not available. In still other embodiments, an operation can be implemented for the file import source as the most accurate source if the built-in job tracking capabilities is not available. In still other embodiments, steps can be provided for searching a historical job tracking database in order to detect the job tracking agent source and providing a flag if the job tracking agent source is not available to indicate a gap in the job tracking agent coverage.

Additionally, in another embodiment, a system can be implememted for automatically selecting an accurate job tracking source. Such a system can include, for example, a processor and a data bus coupled to the processor. Such a system can also include a computer-usable medium embodying computer code, the computer-usable medium being coupled to the data bus, the computer program code comprising instructions executable by the processor, and configured for: managing one or more devices via the disclosed device manager; and associating the disclosed output management unit with the device manager. The output management unit can generally comprise three or more job tracking data sources in order to thereafter rank the at least three job tracking data sources within the device manager based on an accuracy setting. The aformentioned instructions can further be configured to automatically select a most accurate job tracking source with respect to each device from the three or more job tracking data sources in order to effectively monitor and manage an output volume with respect to the one or more devices and thereby reduce an output cost while providing an effective print governance.

In yet another embodiment, a processor-readable medium can be provided for automatically selecting an accurate job tracking source, the processor-readable medium storing code representing instructions to cause a processor to perform a process. The code can be configured to comprise code to: manage at least one device utilizing a device manager; associate an output management unit with the device manager, the output management unit comprising at least three job tracking data sources to thereafter rank the at least three job tracking data sources within the device manager based on an accuracy setting; and automatically select a most accurate job tracking source with respect to each device from the at least three job tracking data sources in order to effectively monitor and manage an output volume with respect to the at least one device and thereby reduce an output cost while providing an effective print governance.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, one or more of the disclosed embodiments can be embodied as a method, system, or computer program usable medium or computer program product. Accordingly, the disclosed embodiments can in some instances take the form of an entire hardware embodiment, an entire software embodiment or an embodiment combining software and hardware aspects all generally referred to herein as a "module." Furthermore, the disclosed embodiments may take the form of a computer usable medium or computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in a conventional procedural programming languages such as the "C" programming language, or in a visually oriented programming environment such as, for example, VisualBasic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network, or the connection may be made to an external computer via most third party supported networks (for example, through the Internet using an Internet Service Provider).

The disclosed embodiments are described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
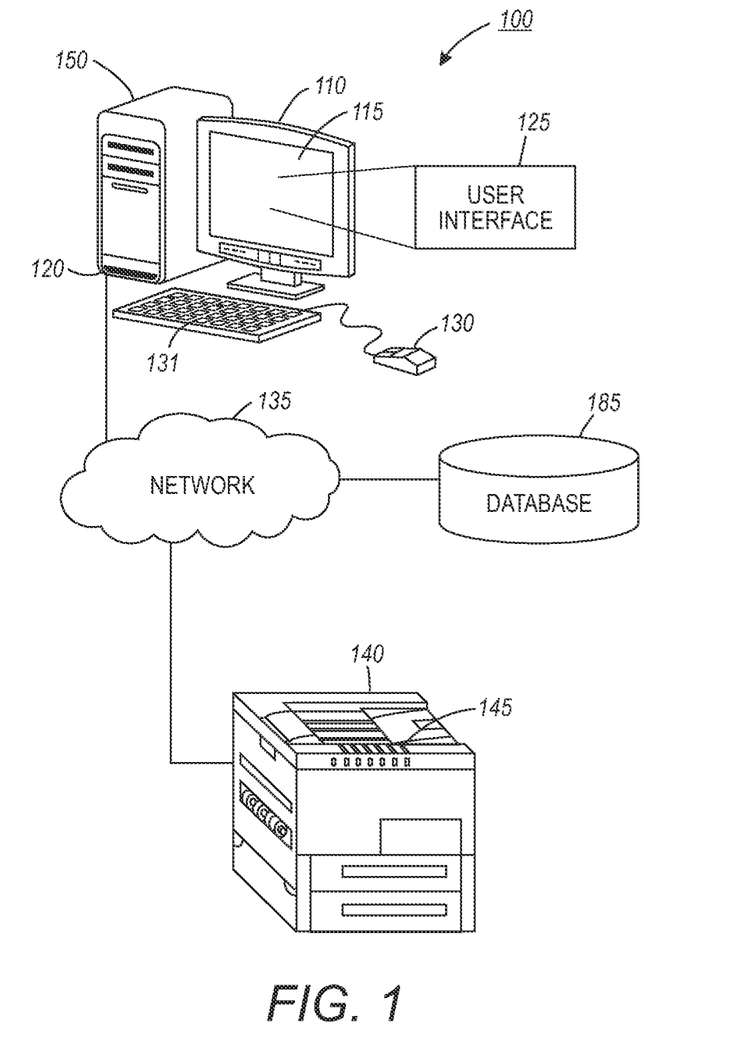
FIG. 1 illustrates an example of a rendering device coupled to a data-processing apparatus through a network, in accordance with the disclosed embodiments.
Figure 2:
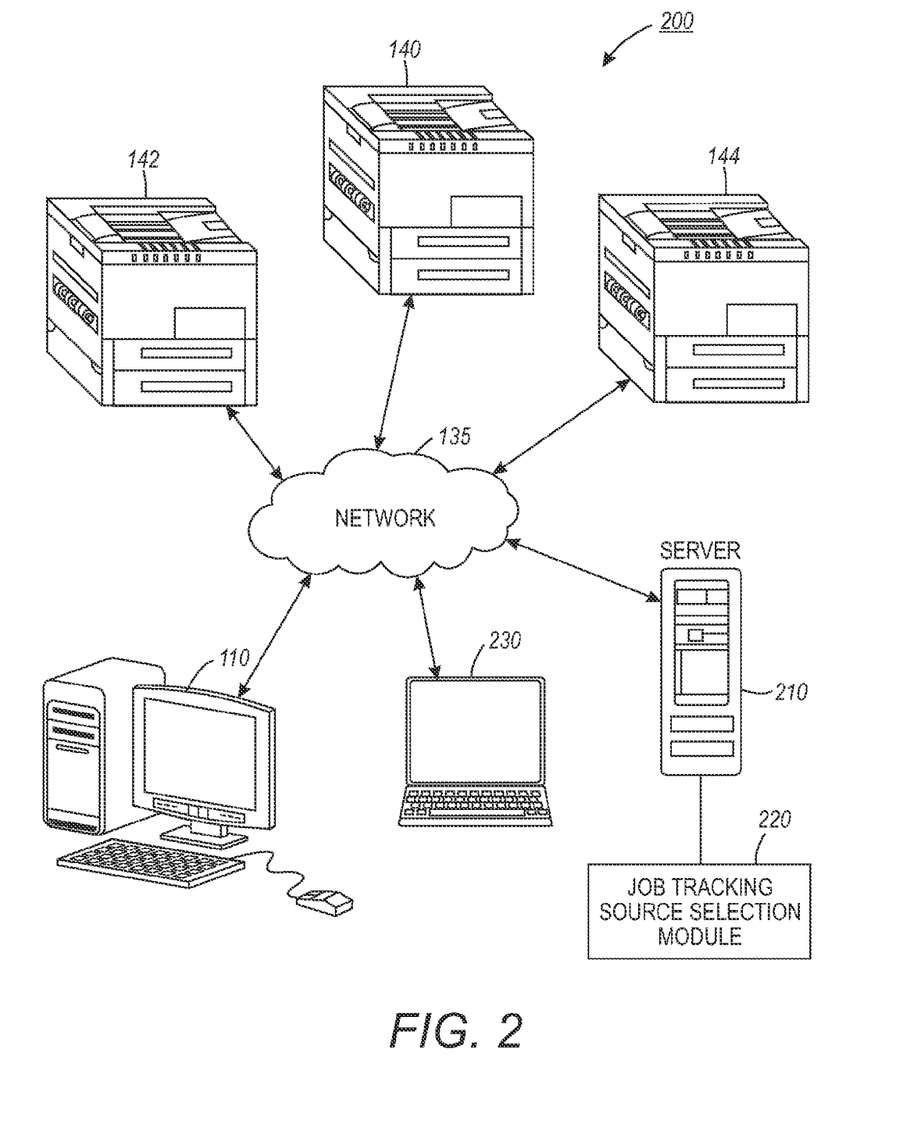
FIG. 2 illustrates a graphical representation of an output management system associated with a network, in accordance with the disclosed embodiments.

Referring to FIGS. 1-2, system 100 and/or system 200 can be configured to include one or more networked devices such as networked devices 140, 142, 144, and the like, which are shown in FIG. 1 as coupled to a data-processing apparatus 110 through a network 135. In some embodiments, one or more of the networked devices 140, 142, 144, for example, may be a rendering device such as a printer, scanner, copy machine, etc. In other embodiments, networked devices 140, 142, and 144 may each be a MFD, a file server, and/or a print server. In still other embodiments, networked devices 140, 142, and 144 may be different types of rendering devices. For example, rendering device 140 may be a MFD, rendering device 144 may be a black and white laser printer, rendering device 142 may be copy machine or a MFD, and so on.

The data-processing apparatus 110 shown in FIGS. 1-2 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140, may be included in association with the data-processing apparatus 110 as desired. Data-processing device 110 can also be, for example, a portable computing device such as a PDA (Personal Digital Assistant), a Smartphone, a tablet computer (e.g., iPad, etc.). It can also be appreciated that network 135 can be in some embodiments configured as a wireless network such a Wi-Fi network.

A non-limiting example of a MFD that can be utilized as one or more of the rendering devices 140, 142, and/or 144 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of a MFD that can be utilized as one or more of the rendering devices 140, 142, and/or 144 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of a MFD that can be utilized as one or more of the rendering devices 140, 142, and/or 144 is disclosed in U.S. Pat. No. 5,920,405, entitled "Multifunction Device With Printer/Facsimile Contention Selection," which issued on Jul. 6, 1999 to McIntyre, et al. U.S. Pat. No. 5,920, 405, which is incorporated herein by reference in its entirety, is also assigned to the Xerox Corporation of Norwalk, Conn.

In general, the data-processing apparatus 110 can communicate with the rendering devices 140, 142, and/or 144 (and other devices) through a computer network 135. Network 135 can employ any network topology, transmission medium, or network protocol. The network 135 can include connections such as wire, wireless communication links, or fiber optic cables. In the depicted example, network 135 can be the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. In other embodiments, network 135 may be an organizational Intranet that communicates with the Internet.

The networked rendering device 140, for example, as shown in FIG. 1, can be configured to include a user interface 145 such as a panel menu. The panel menu may be used to select features and enter other data in the device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a rendering job with the driver for processing by the rendering device 140.

The data-processing apparatus 110 as shown in FIG. 1, for example, can also include a GUI 125 for communicating rendering features for processing, for example, the rendering job to a user and accepting the user's selection of available rendering features. The user interface 125 displays information and receives data through device display and/or the keyboard/mouse combination. The interface 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc.

The input device of the networked device 140 shown in FIG. 1, for example, may be a local user interface 145 such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port.

In general, the following description is presented with respect to embodiments of the present invention, which can be embodied in the context of the data-processing apparatus 110 and the networked device 140 depicted in FIG. 1. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

FIG. 2 illustrates a graphical representation of an output management system 200 associated with network 135, in accordance with the disclosed embodiments. The configuration shown in FIG. 2 thus represents an alternative or more detailed version of the environment shown in FIG. 1. The output management system 200 generally includes a network 135 associated with one or more of the networked rendering devices 140, 142, and 144, data-processing system 110, a mobile communication device (e.g., a laptop, Smartphone, iPad, PDA, etc) 230, and a server 210. The server 210 can function in some embodiments as a print server. It can be appreciated, however, that the data-processing apparatus 110 depicted in FIGS. 1-2 can also be implemented as, for example, a server. In general, other devices such as, for example, desktops, network devices, palmtops, mobile phones, etc. may also be included in the network 135 as service providers. The rendering devices 140, 142, and 144 can be located remotely with respect to each other, or alternatively, they may be located locally with respect to each other.

The typical rendering device may act as a combination of a printer, scanner, photocopier, fax, and e-mail. While three rendering devices 140, 142, and 144 are shown by way of example, it is to be appreciated that any number of rendering devices may be linked to the network such as four, six or more rendering devices. In general, the rendering devices 140, 142, and 144 can be employed to perform a rendering output function (e.g., printing, scanning, copying, faxing, etc.) within a networked environment. Note that rendering devices 140, 142, and 144 are generally analogous to one another.

A job tracking source selection module 220 associated with the server 210 can be adapted for automatically selecting the accurate job tracking source with respect to each rendering device based on availability and accuracy setting. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as USB drives, external storage media, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

Figure 3:
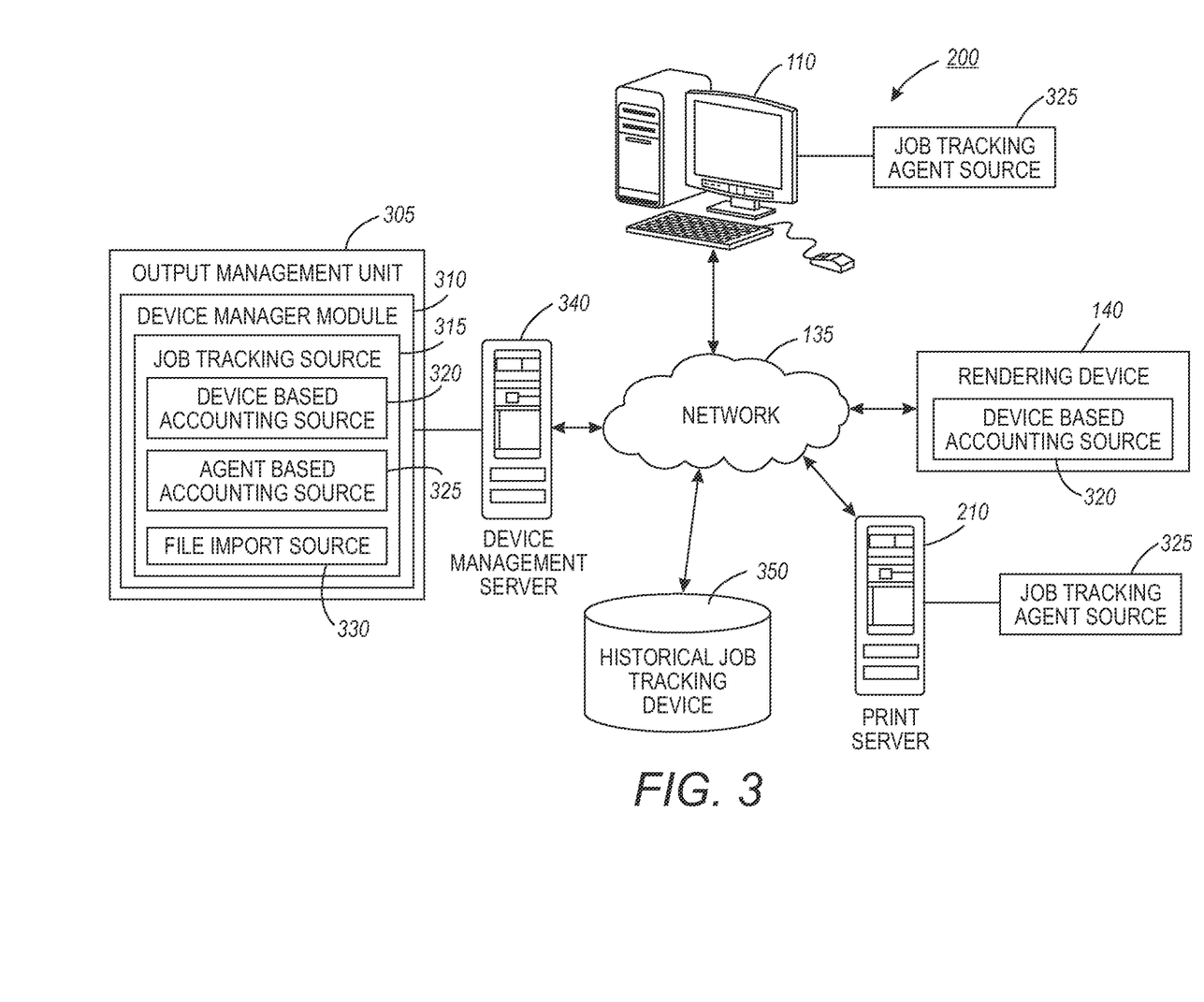
FIG. 3 illustrates a block diagram of the output management system associated with a device manager for selecting an accurate job tracking source, in accordance with the disclosed embodiments.

FIG. 3 illustrates a block diagram of the output management system 200 for selecting the most accurate job tracking source, in accordance with the disclosed embodiments. Note that in FIGS. 1-5, identical or similar blocks are generally indicated by identical reference numerals. The output management system 200 includes a device management server 340 that can be employed to select the most accurate job tracking source in a wide range of business applications. Note that the rendering device 140 disclosed herein can be enabled to include a device based accounting source 320.

The device management server 340 generally includes an output management unit 305 in association with a device manager 310 to control and monitor an output resource such as, for example, the rendering device 140 to enhance operational efficiencies and enable more effective device management. Note that the data-processing apparatus 110 can be configured to function as rendering (e.g., printing) or output management system that is "aware" of production details associated with the rendering job. Note that the term "rendering job" is not limited to a particular electronic format such as a bitmap, but can include any suitable format including PDF, word processor formats, rich text (RTF), etc., as will be appreciated by those skilled in the art. The device manager 310 monitors and manages the output volume of the networked rendering device 140 to reduce output costs, streamline report creation, and lower paper wastage. It can be appreciated that both the device manager 310 and the output management unit 305 can be implemented as a module as described above. It can also be apprecatiated that the server 340 can be in some embodiments the server 210 and/or the data-processing apparatus 110 shown in FIGS. 1-2.

The device manager 310 can be configured to include a job tracking source 315 such as, for example, a device-based accounting source 320, a agent based accounting source 325, and a file import source 330. The device-based accounting source 320, the agent based accounting source 325, and the the import source 330 can be configured by an administrator and can be ranked within the device manager 310 based an accuracy setting. A ranking is a relationship between a set of items such that, for any two items, the first is either 'ranked higher than', 'ranked lower than,' or 'ranked equal to' the second. Thus, for example, job accounting sources 320, 325, and 330 may be ranked based on an estimation of their relevance making it possible for the user quickly to select the potential sources.

In general, the job accounting sources 320, 325, and 330 monitor, allocate, and optimize rendering costs, statistical displays of rendering resources, and schedule automatic e-mail reports for full, detailed accounts of rendering usage. The job accounting sources 320, 325, and 330 provide access to the rendering device 140 through a variety of user authentication approaches or with prepaid rendering accounts. The information collected through the job accounting sources 320, 325, and 330 can be managed utilizing the device manager 310 to create fact-based decisions for enterprise device management.

The agent based accounting source 325 can be mass deployed with respect to the data processing system 110 and the server 210 utilizing standard software deployment approaches by a local system administrator. The agent based accounting source 325 installed on the data processing apparatus 110 and the server 210 collects the rendering job attributes for network and non-networked devices and reports back to the device manager 310. The device manager 310 selects the device-based accounting source 320 as the most accurate source upon detection of a built-in job tracking capability with respect to the multi-function device 140.

The device manager 310 selects the agent based accounting source 325 and/or the the import source 330 as the most accurate source if the built-in job tracking capability is not available. A historical job tracking database 350 can be searched by the device manager 310 in order to detect the job tracking agent source 325 and a flag can be provided if the job tracking agent source 325 is not available to indicate a gap in the job tracking agent coverage. It can be appreciated that the job accounting sources 320, 325, and 330 can be implemented as software modules. The device manager 310 automatically selects the most accurate job tracking source with respect to each device 140, 142, and 144 based on ranking and availability in order to effectively manage the networked rendering devices 140, 142, and 144.

Figure 4:
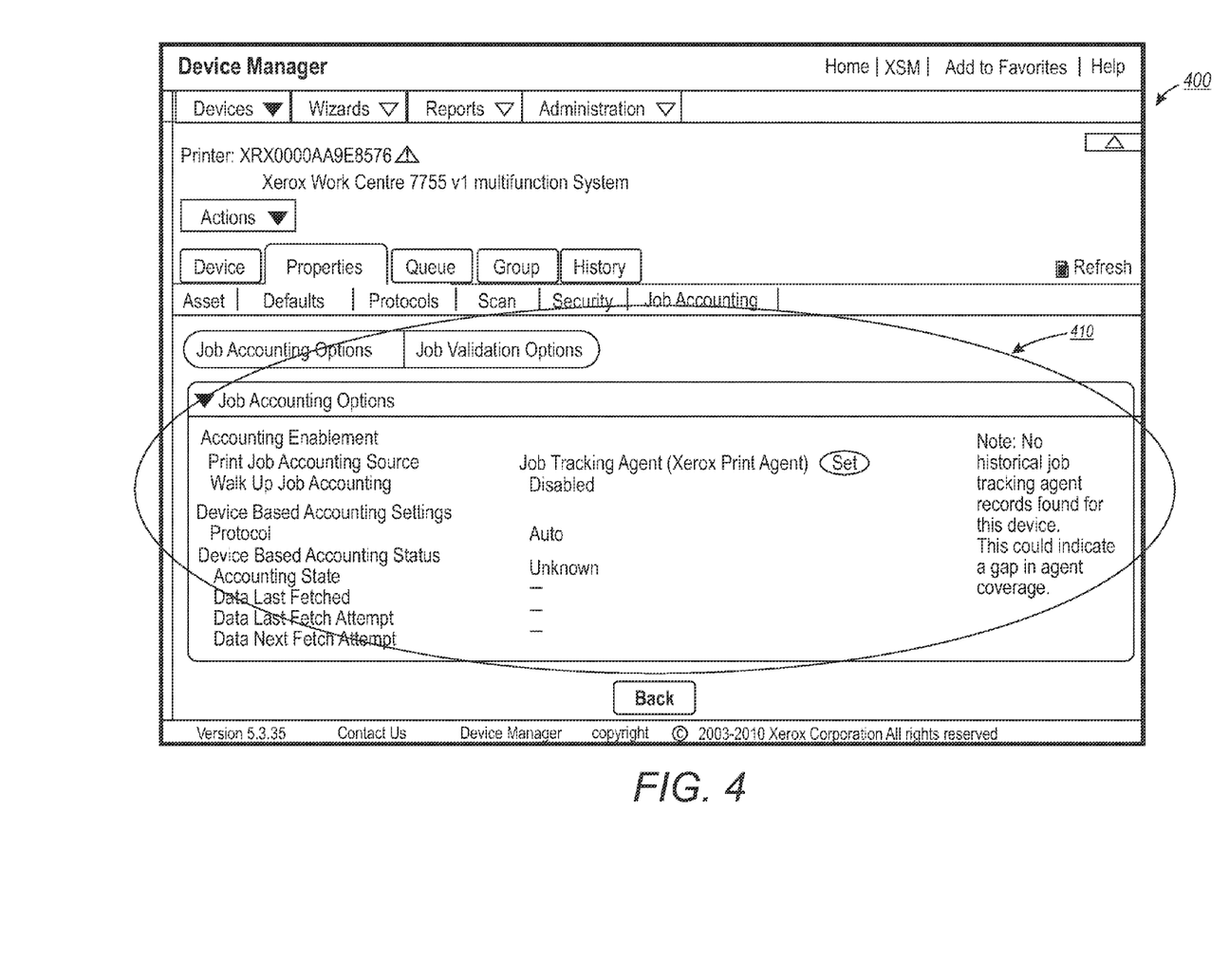
FIG. 4 illustrates a pictorial view of a GUI offering selection of the job tracking source, in accordance with the disclosed embodiments.

FIG. 4 illustrates a pictorial view of a GUI 400 offering selection of the job tracking source, in accordance with the disclosed embodiments. The device manager 310 can be employed to generate the job accounting options 410 that can be displayed at the user interface 125. The GUI 400 can be implemented via a GUI such as, for example, the GUI 125 depicted in FIG. 1 herein, and may be provided by a module such as, for example, module 220 (e.g., a software application) shown in FIG. 2. In the illustrated figures herein, the GUI 400 is generally implemented in the context of a GUI "window". Note that in computing, a GUI "window" is generally a visual area containing some type of user interface.

Such a "window" usually (but not always) possesses a rectangular shape, and displays the output of and may allow input to one or more processes. Such windows are primarily associated with graphical displays, where it can be manipulated with a mouse cursor such as, for example, the input device 130 depicted in FIG. 1. The output management system 200 automatically selects and set the job tracking source, as shown in FIG. 4.

Figure 5:
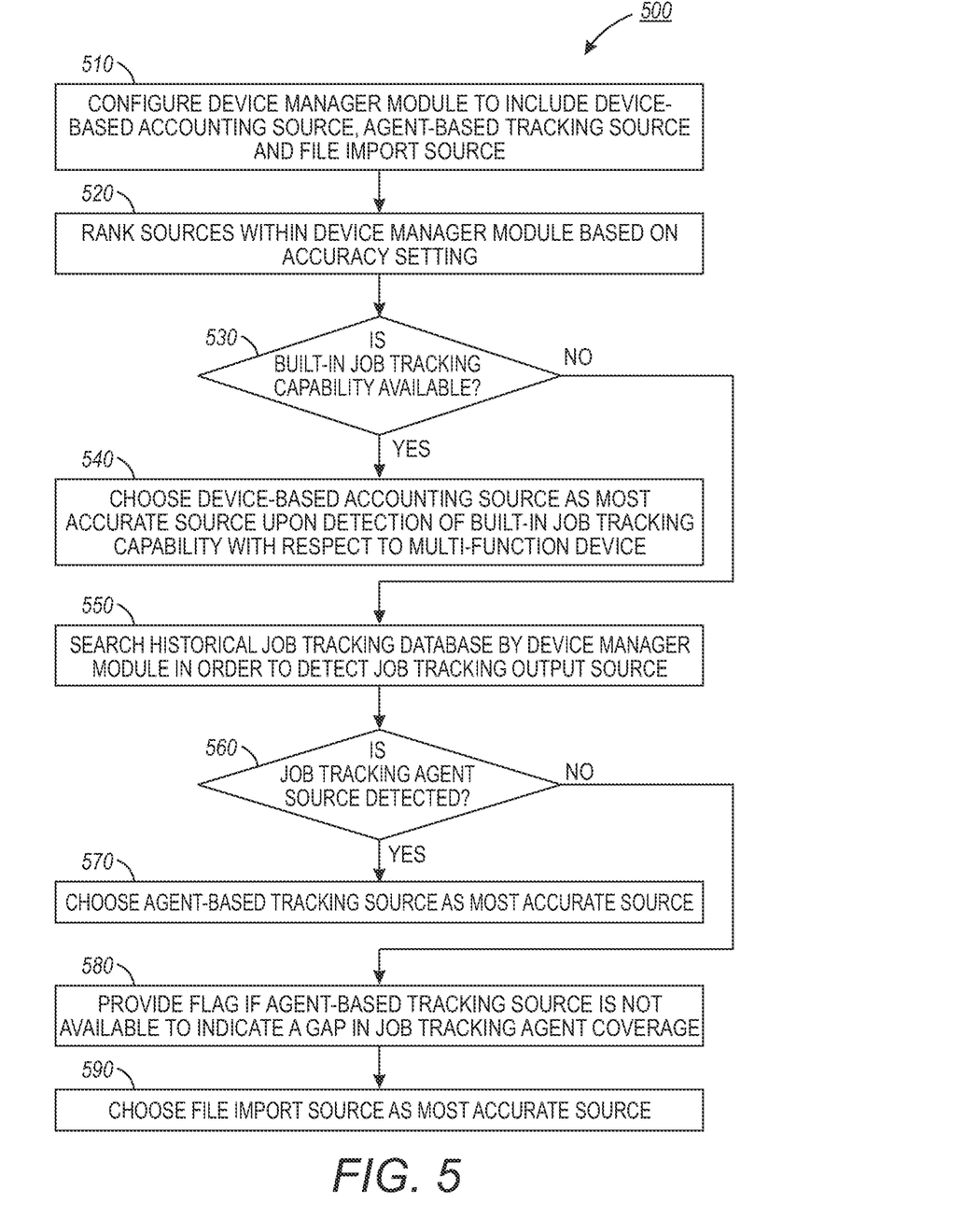
FIG. 5 illustrates a high level flow chart of operations illustrating logical operational steps of a method for automatically selecting the accurate job tracking source with respect to each rendering device based on availability and accuracy setting, in accordance with the disclosed embodiments.

FIG. 5 illustrates a high level flow chart of operations illustrating logical operational steps of a method 500 for automatically choosing an accurate job tracking source with respect to each rendering device based on availability and accuracy setting, in accordance with the disclosed embodiments. It can be appreciated that the logical operational steps shown in FIG. 5 can be implemented or provided via, for example, a module such as module 220 shown in FIG. 2 or other appropriate modules and combinations thereof), such as shown in FIG. 3.

As indicated at block 510, the device manager 310 can be configured to include the device-based accounting source 320, the agent based accounting source 325, and the file import source 330. Thereafter, as illustrated at block 520, an operation can be implemented by an administrator to rank sources within the device manager 310 based on accuracy setting. Next, as indicated at block 530, a determination can be made whether a built-in job tracking capability is available with respect to the multifunction device 140. Upon detection of built-in job tracking capability with respect to rendering device 140, the device-based accounting source 320 can be selected as most accurate source, as shown at block 540.

Otherwise, the historical job tracking database can be searched by the device manager 310 in order to detect the agent based accounting source 325, as indicated at block 550. Following the process of the operation depicted at block 550, a determination can be made whether the job tracking agent based accounting source 325 is detected, as shown at block 560. If the job tracking agent source is detected the agent based accounting source 325 can be selected as the most accurate source, as depicted at block 570. Otherwise, a flag can be provided to indicate a gap in the job tracking agent coverage, as indicated at block 580. Next, the file import source 330 can be selected as the most accurate source, as depicted at block 590.

Based on the foregoing, it can be appreciated that a variety of embodiments, preferred or alternative, can be implemented. For example, in one embodiment, a method may be provided for automatically selecting an accurate job tracking source. Such a method can include a step or managing one or more devices utilizing a device manager and/or establishing a device manager for managing one or more such devices. Additional steps may include, for example, configuring an output management unit in association with the device manager to include one or more job tracking data sources in order to thereafter rank the one or more of the job tracking data sources within the device manager based on an accuracy setting. Other steps may include associating the output management unit with the device manager. Additional steps can include automatically selecting a most accurate job tracking source with respect to each device from the three or more job tracking data sources in order to effectively monitor and manage an output volume with respect to one or more of the devices and thereby reduce an output cost while providing an effective print governance.

In other embodiments, job tracking data sources can comprise, for example, a device-based accounting source, a agent based accounting source, a file import source, etc. In still other embodiments, a step can be implemented for selecting the device-based accounting source as a most accurate source upon a detection of a built-in job tracking capability with respect to one or more of the devices. In other embodiments, a step can be provided for selecting the agent based accounting source as the most accurate source if the built-in job tracking capability is not available. In still other embodiments, an operation can be implemented for the file import source as the most accurate source if the built-in job tracking capability is not available. In still other embodiments, steps can be provided for searching a historical job tracking database in order to detect the job tracking agent source; and providing a flag if the job tracking agent source is not available to indicate a gap in the job tracking agent coverage.

Additionally, in another embodiment, a system can be implememted for automatically selecting an accurate job tracking source. Such a system can include, for example, a processor and a data bus coupled to the processor. Such a system can also include a computer-usable medium embodying computer code, the computer-usable medium being coupled to the data bus, the computer program code comprising instructions executable by the processor, and configured for: managing one or more devices via the disclosed device manager, and associating the disclosed output management unit with the device manager. The output management unit can generally comprise three or more job tracking data sources in order to thereafter rank the at least three job tracking data sources within the device manager based on an accuracy setting. The aformentioned instructions can further be configured to automatically select a most accurate job tracking source with respect to each device from the three or more job tracking data sources in order to effectively monitor and manage an output volume with respect to the one or more devices and thereby reduce an output cost while providing an effective print governance.

In yet another embodiment, a processor-readable medium can be provided for automatically selecting an accurate job tracking source, the processor-readable medium storing code representing instructions to cause a processor to perform a process. The code can be configured to comprise code to: manage at least one device utilizing a device manager; associate an output management unit with the device manager, the output management unit comprising at least three job tracking data sources to thereafter rank the at least three job tracking data sources within the device manager based on an accuracy setting; and automatically select a most accurate job tracking source with respect to each device from the at least three job tracking data sources in order to effectively monitor and manage an output volume with respect to the at least one device and thereby reduce an output cost while providing an effective print governance.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for automatically selecting an accurate job tracking source, said method comprising:
    establishing a device manager for managing at least one device and controlling and monitoring at least one output resource;
    configuring an output management unit in association with said device manager to include at least three job tracking data sources, wherein said at least three job tracking data sources comprise data relating to job tracking, in order to thereafter rank said at least three job tracking data sources within said device manager based on an accuracy setting; and
    automatically selecting a most accurate job tracking source with respect to each device from said at least three job tracking data sources in order to effectively monitor and manage an output volume with respect to said at least one device and thereby reduce output cost while providing an effective print governance.

2. The method of claim 1 further comprising configuring at least one of said at least three job tracking data sources to comprise a device-based accounting source.

3. The method of claim 2 further comprising selecting said device-based accounting source as a most accurate source upon detection of a built-in job tracking capability with respect to said at least one device.

4. The method of claim 1 further comprising configuring at least one of said at least three job tracking data sources to comprise an agent based accounting source.

5. The method of claim 1 further comprising configuring at least one of said at least three job tracking data sources to comprise a file import source.

6. The method of claim 5 further comprising selecting said file import source as a most accurate source if a built-in job tracking capability is not available.

7. The method of claim 1 further comprising configuring said at least three job tracking data sources to comprise at least one of the following types of sources:
    a device-based accounting source;
    an agent based accounting source; and
    a file import source.

8. The method of claim 7 further comprising selecting said agent based accounting source as a most accurate source if a built-in job tracking capability is not available.

9. The method of claim 7 further comprising:
    searching a historical job tracking database in order to detect a job tracking agent source; and
    providing a flag if a job tracking agent source is not available to indicate a gap in said job tracking agent coverage.

10. The method of claim 7 wherein said at least one device comprises a rendering device.

11. The method of claim 1 further comprising configuring said at least three job tracking data sources to comprise at least two of the following types of sources:
    a device-based accounting source;
    an agent based accounting source; and
    a file import source.

12. A system for automatically selecting an accurate job tracking source, said system comprising:
    a device manager that manages at least one device and controls and manages at least one output resource;
    an output management unit associated with and which communicates with said device manager, said output management unit comprising at least three job tracking data sources, wherein said at least three job tracking data sources comprise data relating to job tracking, in order to thereafter rank said at least three job tracking data sources within said device manager based on an accuracy setting; and
    a most accurate job tracking source that is selectable with respect to each device from said at least three job tracking data sources in order to effectively monitor and manage an output volume with respect to said at least one device and thereby reduce output cost while providing an effective print governance.

13. The system of claim 12 wherein at least one of said at least three job tracking data sources comprises a device-based accounting source.

14. The system of claim 12 wherein at least one of said at least three job tracking data sources comprises an agent based accounting course.

15. The system of claim 12 wherein at least one of said at least three job tracking data sources comprises a file import source.

16. The system of claim 12 wherein said at least three job tracking data sources comprises at least one of the following types of sources:
    a device-based accounting source;
    an agent based accounting source; and
    a file import source.

17. The system of claim 16 wherein said agent based accounting source is selectable as a most accurate source if a built-in job tracking capability is not available.

18. The system of claim 16 wherein said import source is selectable as a most accurate source if a built-in job tracking capability is not available.

19. The system of claim 16 further comprising:
    a historical job tracking database that is searchable in order to detect a job tracking agent source and provide a flag if said job tracking agent source is not available to indicate a gap in job tracking agent coverage.

20. The system of claim 12 wherein said at least three job tracking data sources comprises at least two of the following types of sources:
    a device-based accounting source;
    an agent based accounting source; and
    a file import source.

* * * * *